United States Patent [19]
Meyers

[11] Patent Number: 5,726,810
[45] Date of Patent: Mar. 10, 1998

[54] COMPACT ZOOM LENS

[75] Inventor: Mark M. Meyers, Hamlin, N.Y.

[73] Assignee: Eastman Kodak Company, Rochester, N.Y.

[21] Appl. No.: 673,713

[22] Filed: Jun. 21, 1996

Related U.S. Application Data

[60] Provisional application No. 60/004,207 Sep. 22, 1995.

[51] Int. Cl.$^6$ ................................................. G02B 15/14
[52] U.S. Cl. ........................ 359/684; 359/791; 359/689
[58] Field of Search ........................... 359/684, 791, 359/689, 695

[56] References Cited

U.S. PATENT DOCUMENTS

| | | | |
|---|---|---|---|
| 4,726,668 | 2/1988 | Nakayama et al. | 350/427 |
| 4,983,027 | 1/1991 | Kojima et al. | 350/427 |
| 5,069,536 | 12/1991 | Ogata | 359/689 |
| 5,087,988 | 2/1992 | Nakayama | 359/689 |
| 5,148,321 | 9/1992 | Goto et al. | 359/689 |
| 5,216,547 | 6/1993 | Ogata | 359/689 |
| 5,235,235 | 8/1993 | Takashima et al. | 359/689 |
| 5,353,159 | 10/1994 | Morooka | 359/689 |
| 5,353,160 | 10/1994 | Ogata | 359/689 |
| 5,566,026 | 10/1996 | Yoon | 359/689 |
| 5,572,365 | 11/1996 | Ito | 359/684 |

*Primary Examiner*—Hoa Q. Pham
*Attorney, Agent, or Firm*—Svetlana Z. Short

[57] ABSTRACT

A compact zoom lens with three lens units of positive, positive and negative optical powers, respectfully. The front and the rear lens units move together for zooming and the middle unit moves independently. There is one aspheric surface in each of the three lens units. An aperture stop is located with the front lens unit.

19 Claims, 17 Drawing Sheets

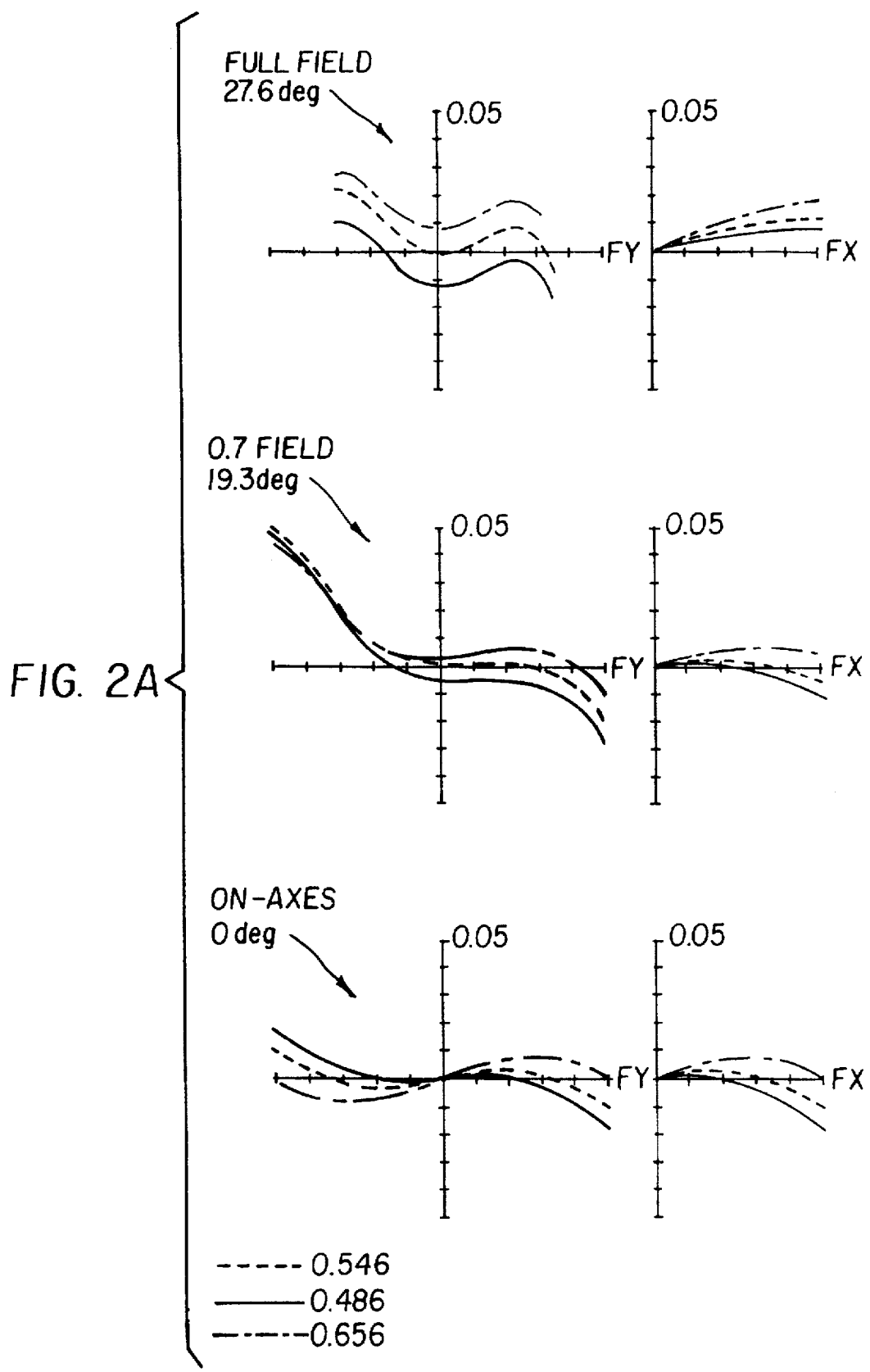

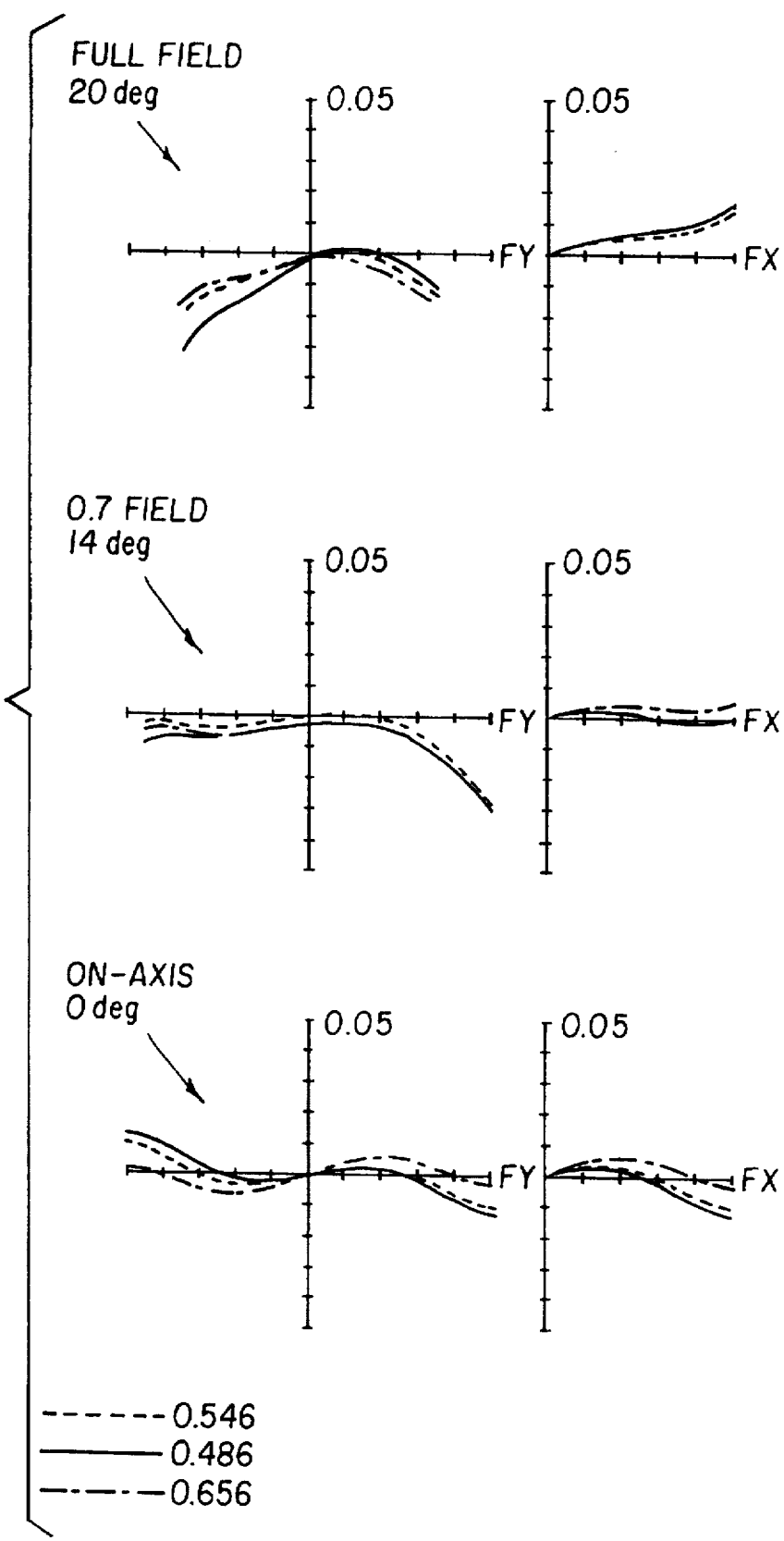

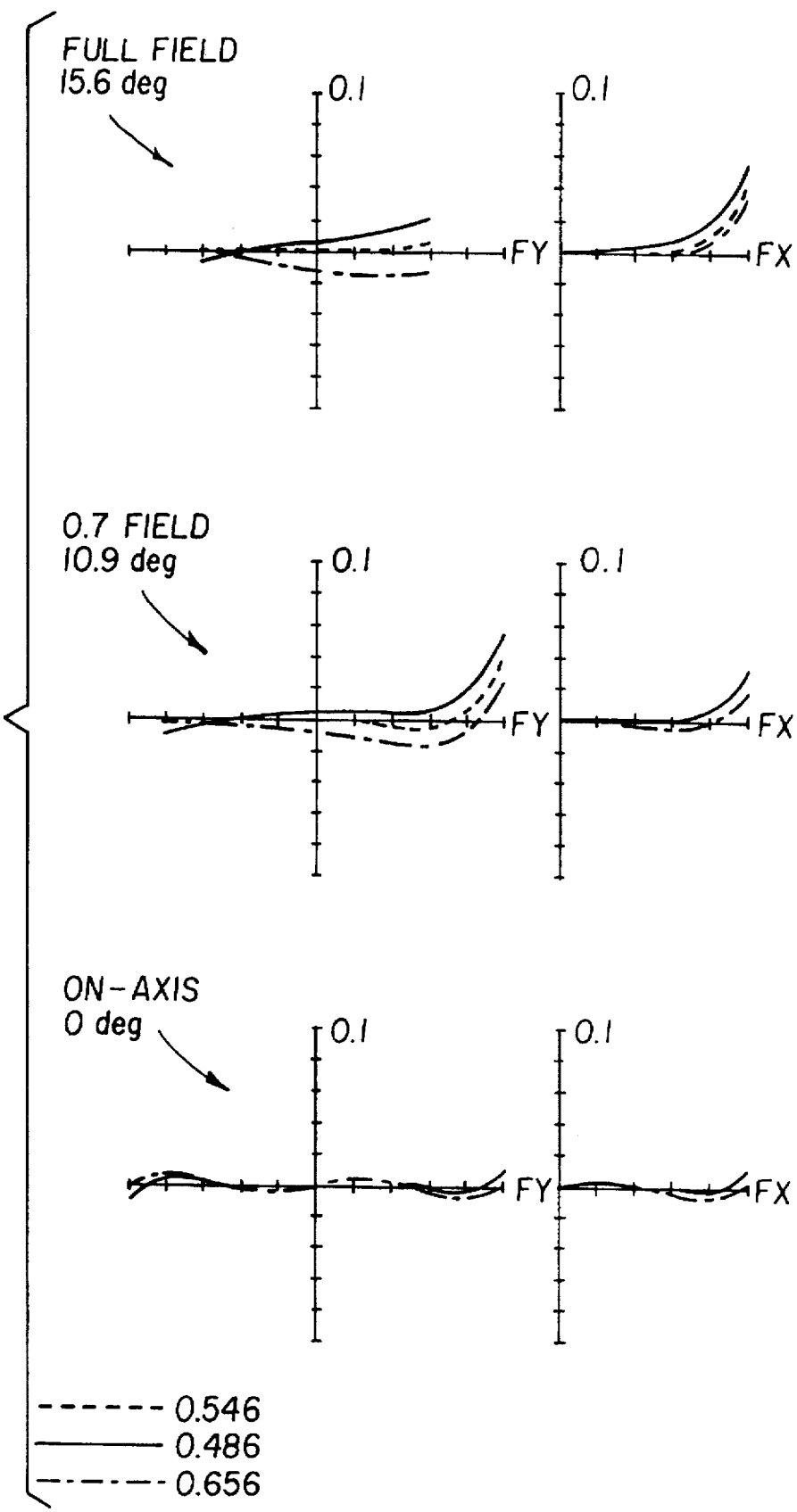

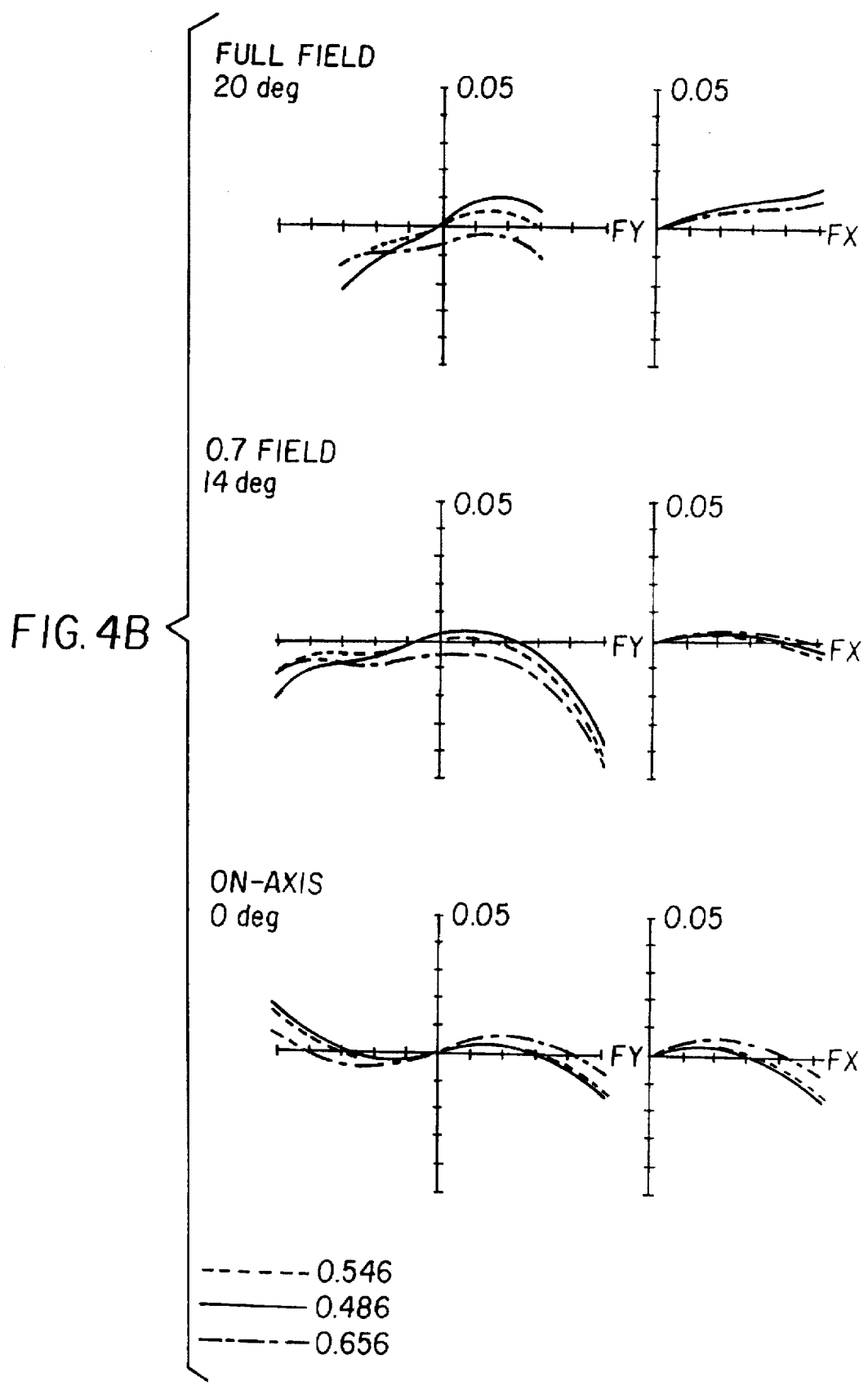

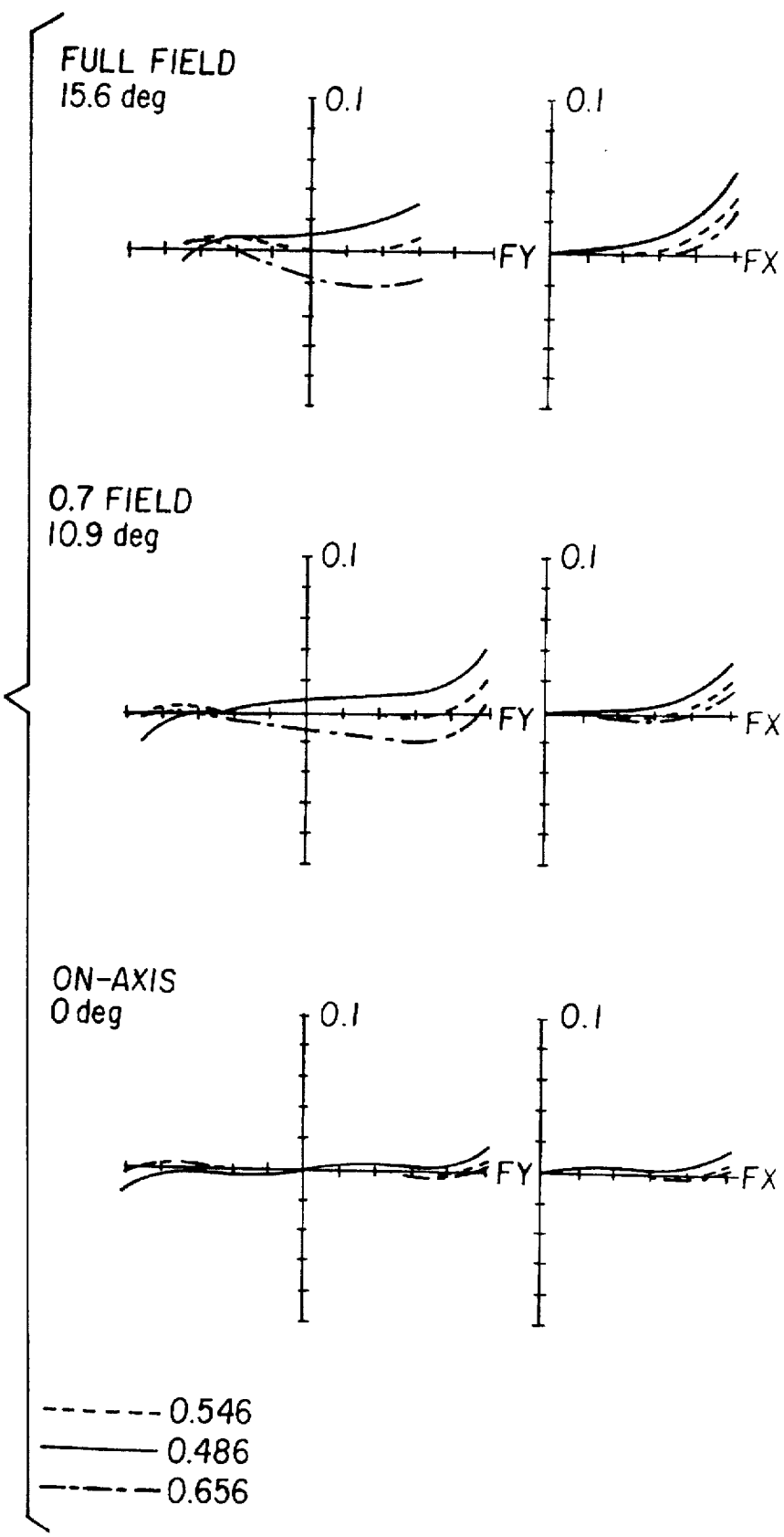

COMPACT ZOOM LENS

BACKGROUND OF THE INVENTION

This application is based on provisional application Ser. No. 60/004,207 filed Sep. 22, 1995.

1. Field of the Invention

This invention relates to compact zoom lenses having a small number of lens elements, and more particularly to zoom lenses which are suited for use as an objective or taking lens in photographic cameras, video cameras, electronic cameras, or the like.

2. Description of the Prior Art

Zoom lenses generally are formed of a plurality of groups (units) of one or more lens elements. It has been known to make three-unit zoom lenses with a positive front lens unit, a positive middle lens unit, and a negative rear lens unit. However, because of the desire to reduce the size, weight and costs of cameras with zoom lenses, efforts are being made to create more compact zoom lenses (also referred to as zoom lens systems) with a small number of lens elements and a minimum number of independent zooming lens units, while still producing high quality images over a large zooming range.

More specifically, a zoom lens system must maintain high image quality in each zoom position and retain a flat field over a range of field angles. In addition, it is desirable to have a minimum front vertex to film distance in the telephoto position. This provides a small package size and decreases the overall lens system volume. It is also desirable to have a minimal number of separate zooming lens units in order to decrease mechanical complexity. However, the requirement to produce a compact zoom lens system with a minimum number of independently movable zooming lens units often conflicts with the requirement to produce high quality images over a large zoom range.

The compactness of the lens system can be determined by the total length D of the lens system, measured from the front vertex of the lens system to its rear vertex. The smaller D is the more compact of the lens system.

The compactness of the zoom lens system can also be measured by the ratio $L_v$ to $f_t$, where $L_v$ is the distance from the front vertex of the lens system to the film plane in the telephoto position and $f_t$ is the focal length of the lens system in the telephoto position. The smaller the ratio, the more compact the zoom lens system. However, as stated above, the compactness of the lens system should not come as a result of reduced zoom range (herein referred to as zoom ratio ZR) or reduced optical performance. The zoom ratio ZR is measured by the ratio of lens system's focal lengths, i.e. $ZR=f_t/f_w$, where $f_w$ is the focal length of the zoom lens system in the wide-angle mode.

The following four U.S. patents all describe zoom lens systems which have three lens units of positive, positive and negative optical power, respectfully. All four of these patents disclose that the aperture stop is located with the middle lens unit (i.e. the aperture stop moves integrally with the middle lens unit).

U.S. Pat. No. 4,726,668, issued Feb. 23, 1988, discloses a zoom lens system with three lens units of positive, positive and negative optical powers, respectfully. An aperture stop is located within the middle lens unit. The front and the rear lens units move independently of each other while the second unit, which contains an aperture stop, is held stationary during zooming. This lens system has six lens elements and its total length D from the front vertex of the lens system to its rear vertex is 46.95 at the telephoto position. At the wide-angle position, the maximum amount of distortion is 5% and the amount of astigmatism is 0.8 millimeters. In the telephoto position, the distortion amount is again about 5% and the maximum astigmatism is greater than 0.8 millimeters. It is desirable to have a lens system that has better performance with respect to astigmatism and distortion, fewer lens elements and that is more compact, i.e. a lens system which has a substantially smaller total length D in the telephoto position.

U.S. Pat. No. 5,353,160, issued Oct. 4, 1994, discloses a zoom lens system which has either four or five lens elements arranged into three movable lens units. The lens system has a zoom ratio $ZR=f_t/f_w=2.0$, but its compactness ratio $L_v/f_t$ is 0.93. The amount of distortion is about 2% to 4% at the wide-angle position and about 2% to 4% at the telephoto position for the various embodiments shown. The amount of astigmatism is about 0.4 millimeters in the wide-angle position and about 0.4 to 0.6 millimeters in telephoto position.

U.S. Pat. No. 5,325,235, issued Jun. 28, 1994, has relatively few lens elements (four). Its zoom ratio ZR is about 1.6 and its compactness ratio is about 1.0 (for example, it is 0.96 and 1.13 in the embodiments 3 and 5, respectfully). Thus, this zoom lens system is even less compact than the zoom lens system described in U.S. Pat. No. 5,353,160. The maximum amount of astigmatism ranges from about 0.5 millimeters to about 1.0 millimeters in both the wide-angle and telephoto modes. Depending on the embodiment, the distortion varies from about 0.5% to about 2% when the lens system is in the telephoto position and from about 2% to about 5% when the lens system is in the wide-angle position.

U.S. Pat. No. 5,353,159, issued Oct. 4, 1994, discloses a zoom lens system with three lens units that move during zooming. The zoom lens system has a zoom ratio ZR of about 1.87, and a compactness ratio of about 1.01. This zoom lens system has 8 or 9 lens elements. The amount of distortion ranges from about 1% to about 4% in both the telephoto and wide-angle positions. The amount of astigmatism ranges from about 0.2 millimeters to about 0.5 millimeters when the lens system is in the wide-angle position and from about 0.2 to 0.7 millimeters when the lens system is in the telephoto position.

Other patents also provide a three unit lens system, but they are either substantially less compact than the U.S. patents described above, have a substantially greater number of lens elements or have a substantially smaller zoom ratio.

SUMMARY OF THE INVENTION

An object of the present invention is to provide a zoom lens system which offers superior optical performance, as few as possible independently movable lens units, a relatively large zoom range (i.e. a zoom ratio larger than 1.5) and which is more compact than prior art zoom lens systems.

The zoom lens according to the present invention comprises three lens units. More specifically, there is a front lens unit of positive refractive power consisting of a positive lens element and a negative lens element, a middle lens unit of positive refractive power, and a rear lens unit of negative refractive power. During zooming from a wide-angle to a telephoto position, the front lens unit and the rear lens unit are integral so as to be simultaneously movable at the same speed and direction. The middle lens unit moves towards the object side at a relatively slower speed than that at which the front and the rear lens units are moved. The lens elements have sufficient optical powers, spacings and radii of curvature to provide for a large zoom range ZR and to maintain an overall compactness so that $L_v/f_t<0.9$ and $ZR=f_t/f_w>1.5$, where $L_v$ is the distance from the front vertex of the lens system to the film plane in the telephoto position, $f_t$ is the focal length of the lens system in the telephoto position, and $f_w$ is the focal length of the zoom lens system in the wide-angle position.

According to a preferred embodiment of the present invention, an aperture stop moves integrally with lens elements of the front lens unit.

Also, according to a preferred embodiment of the present invention, the lens system has at least one aspheric surface in each of the three lens units.

With the preferred embodiment of the invention, the following and other advantages are realized. It is an advantage of the zoom lens of the present invention is that it is compact (i.e. it has a compactness ratio $L_v/f_t<0.9$), while having a zoom range ZR of over 1.5 and providing superior image quality.

BRIEF DESCRIPTION OF THE DRAWINGS

FIG. 1A is a sectional view of the lens system 100 in a wide-angle position. FIG. 1B is a sectional view of the lens system 100 in a middle position. FIG. 1C is a sectional view of the lens system 100 in a telephoto position;

FIGS. 2A–2F are graphical representations of the aberrations of the lens system 100 illustrated in FIGS. 1A–1C;

FIGS. 2G–2I are plots of the Modulation Transfer Function (MTF) vs. frequency of the lens system 100 in wide-angle, middle, and telephoto positions, respectively;

FIG. 3A is a sectional view of the lens system 200 in a wide-angle position. FIG. 3B is a sectional view of the lens system 200 in a middle position. FIG. 3C is a sectional view of the lens system 200 in a telephoto position;

FIGS. 4A–4F are graphical representations of the aberrations of the lens system 200 illustrated in FIGS. 3A–3C;

DESCRIPTION OF THE PREFERRED EMBODIMENT

The embodiments of the invention illustrated by two examples are shown respectively in FIGS. 1A–1C and 3A–3C, and which are set fourth in Tables 1A–1C and 2A–2C respectively. In the tables and the drawings, the surfaces R are numbered by subscripts from the front or object side of the lens to the rear or image side of the lens. The thickness T of the lens elements and the spacings S between elements are also numbered from front to rear. For example, $S_1$ corresponds to the first air space, $S_2$ to the second air space, $S_3$ to the third air space, and $S_4$ to the fourth airspace. In the tables, spaces and thicknesses are listed on the same line as the surface preceding the space or thickness, as the case may be. All indices $N_e$ are for the mercury e line of the spectrum at a wavelength $\lambda_e$ of 546.1 nm. The symbol v stands for the abbe number for the lens material. The thickness and spacings provided in tables are in millimeters.

Description of Lens Unit Configuration

Figure 5:
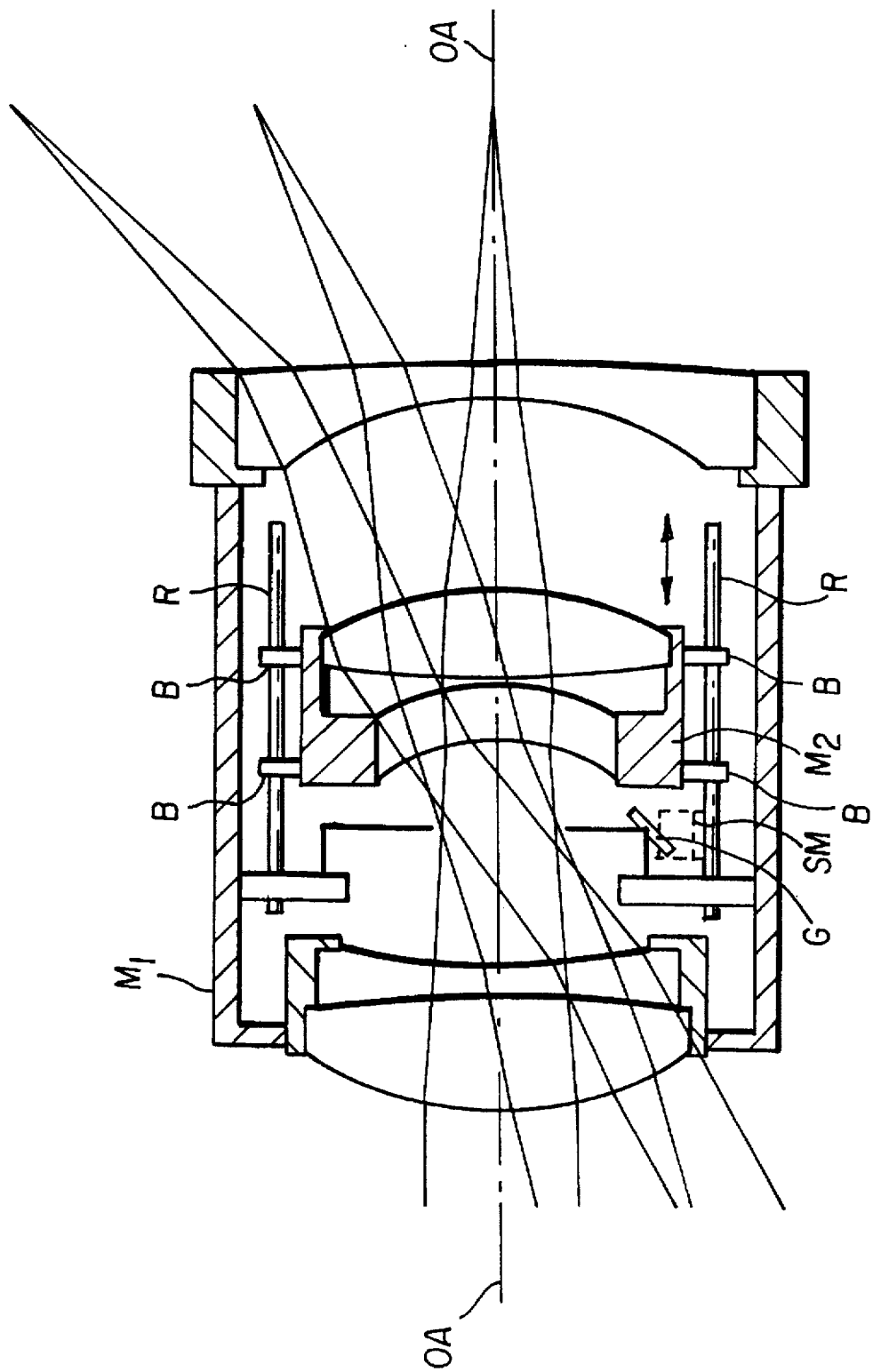
FIG. 5 is a schematic side-sectional view of a zoom lens system 100, 200 and a mount.

In the present invention, a zoom lens system includes three axially movable lens units $U_1$, $U_2$ and $U_3$. Lens units $U_1$ and $U_3$ are linked together mechanically and move together during zooming, as shown in FIG. 5. Therefore, the space between these two lens units (i.e. $U_1$ and $U_3$) does not vary for zooming, and thus have the substantial advantage of requiring a much simpler zooming mechanism than those required by typical zoom lens systems having three independently moving lens units. More specifically, the front lens unit $U_1$ and the rear lens unit $U_3$ move integrally. They are simultaneously movable at the same speed and direction, while the middle lens unit $U_2$ is movable in the same direction at a slower speed. The space between the first lens unit $U_1$ and the middle lens unit $U_2$ widens while the airspace between the middle lens unit $U_2$ and the rear lens unit $U_3$ narrows as the three lens units move toward the object side (along an optical axis) when the zoom lens system zooms from a wide-angle position (W) towards a telephoto position (T).

According to the illustrative embodiments, the front lens unit $U_1$ is an achromatized positive power doublet. The focal length $FL_1$ of the first lens unit $U_1$ is about 43.7 mm and its power is about $2.3\times10^{-2}$. It is preferable for this doublet to be a cemented doublet with a positive power lens element $E_1$ located in front (i.e. towards the object side) and a negative power lens element $E_2$ located behind lens element $E_1$. The use of a cemented doublet as the front lens unit $U_1$ allows for the achromatization of one of the zooming lens units. In addition, using a cemented doublet makes for simplified mounting and alignment of the front lens unit $U_1$ compared to what is required in a design which utilizes airspaced doublets, such as the one disclosed in the above-mentioned U.S. Pat. No. 5,353,160. This simplification occurs because it is easier to center two lens elements which are cemented together before they are mounted in a lens barrel, than it is to center two airspaced lens elements in the lens barrel. This is due to the typical manufacturing variations of mount surfaces and variations of lens element diameters. Displacement of the optical axis of the two non-cemented lens elements caused by lens diameter variations or mounting variation can cause aberrations such as field tilt and axial color.

Furthermore, using a positive power front lens element $E_1$ allows the light rays to be bent towards focus (i.e. to converge) at the first surface, whereas a negative power front lens element actually causes the light rays to diverge. Thus, the lens system with the positive power front lens element $E_1$ can be more compact (i.e. shorter) than a similar lens system with a negative power front lens element. Additionally, the lens system with a positive power front lens element can use lens elements with smaller clear aperture diameters in the front lens unit. Having a positive power frontmost lens element $E_1$ also helps to achieve a better telephoto ratio $(L_v/f_t$ and $L_v/f_w)$. Finally, the positive front unit $U_1$, where the front lens element $E_1$ is positive, produces lower overall astigmatism, flatter field curves (lower petzval curvature) and generates less image plane distortion over the zooming range than similar zoom lenses with a negative power front lens element in the front lens unit.

According to the illustrative embodiments, the middle lens unit $U_2$ is located behind the front lens unit $U_1$. The middle lens unit $U_2$ is also positive (i.e. it has positive power). It contains two very slightly airspaced lens elements (a meniscus lens element $E_3$ and a biconvex lens element $E_4$). The focal length $FL_2$ of the second lens unit $U_2$ is about 20 millimeters and its power is about $5\times10^{-2}$.

The rear optical unit $U_3$ is substantially negative in power. Its focal length is about −15.5 millimeters and its power is about $-6.5 \times 10^{-2}$. The rear optical unit $U_3$ contains a relatively strong negative power lens element $E_5$ with a concave object side surface $S_8$. It is preferred that the absolute value of the ratio of lens unit powers $\phi_3$ to $\phi_2$ is approximately 1.2 to 1.3 millimeters. The object side surface $S_8$ of lens element $E_5$ has a smaller radius of curvature then that of the image side surface $S_9$. The use of a strong negative lens element $E_5$ in the rear allows for the zoom lens to have a very effective field flattener when the lens system is in wide-angle position and provides for a high level of aberration correction in the telephoto position. The compact zoom lens system of the present invention also achieves minimization of the front vertex to film plane distance partially via the use of the strong rear lens element $E_5$ and also due to the relative movement of the middle lens unit $U_2$ towards this negative lens element $E_5$.

Aperture Stop

The aperture stop AS is in the form of a shutter which is positioned with the front lens unit $U_1$. That is, the shutter moves together with the front lens unit $U_1$. This positioning of the aperture stop AS is advantageous because it facilitates correction of aberrations of the lens system, especially at its telephoto position. The placement of the aperture stop AS with the front lens unit $U_1$ helps to provide a large numerical aperture (F/7.0) at the long focal length position (i.e., telephoto position).

Stop shifted aberrations, which are always present in zoom lens systems to some extent and which are described in Smith, *Modern Optical Engineering*, (second edition) published by McGraw-Hill, Inc., tend to vary more if the distance between the aperture stop and the front zoom lens unit varies. Thus, placing the aperture stop AS with the front lens unit $U_1$ allows better control of aberration such as distortion through the stop shift equation. That is, moving the aperture stop AS relative to the front lens unit $U_1$ (i.e. the first zooming unit) causes the distortion to change with zoom position. On the other hand, we found that placing the aperture stop AS with the front lens unit $U_1$ significantly improved distortion correction.

The location of the aperture stop AS behind the lens elements of the front lens unit $U_1$ also allows better control of astigmatism as a function of zoom position, because highly aberrated rays in the wide-angle position can more easily be vignetted out of the image forming bundle.

In addition, the placement of the aperture stop with the front lens unit $U_1$ reduces the size of the first lens unit $U_1$, which simplifies mounting and reduces the size of the telescoping zoom lens barrel.

As shown in FIG. 5, the mechanical mount for this type of zoom lens is generally constructed with the larger mount $M_1$ connecting the front and rear lens units $U_1$ and $U_3$ and a smaller mount $M_2$ for the middle lens unit $U_2$ which is nested inside the larger lens mount. Having the shutter attached to the front lens unit $U_1$ allows the shutter to be mounted on a larger lens mount $M_1$ which links the front and rear lens units $U_1$ and $U_3$ together. A gearing mechanism G and a stepping motor SM could be used to control the opening size of the shutter. Locating the shutter with the front lens unit $U_1$ is more advantageous than locating it with the middle lens unit $U_2$ since there is more room around the front lens unit $U_1$ and the larger mount $M_1$ is more stable mechanically (see FIG. 5).

In addition, mount $M_1$ has fewer mechanisms associated with it than mount $M_2$ and is therefore easier to access. Thus, it is easier to assemble and align the shutter and other lens elements, which leads to low cost lens systems.

Aspheric Surfaces

The lens system 100, 200 has three aspheric surfaces— one in each lens unit. The aspheric equation describing these aspheric surfaces is:

$$X = \frac{CY^2}{1+\sqrt{1-(K+1)C^2Y^2}} + ADY^4 + AEY^6 + AFY^8 + AGY^{10} + AHY^{12} + AIY^{14} + AJY^{16} + AKY^{18}$$

where:

X is the distance along the optical axis OA;

Y is the height from the optical axis;

C is the reciprocal of the vertex radius of curvature of the curved lens surface;

K is the conic coefficient; and

AD through AK are aspheric coefficients of 4th, 6th, 8th, 10th, 12th, 14th, 16th, and 18th order. The values of the aspheric coefficients for the various aspheric lens surfaces for the two lens embodiments are provided in Tables 1B and 2B.

More specifically, the aspheric surfaces are located on the surfaces with radii $R_1$, $R_5$ and $R_8$ associated with lens elements $E_1$, $E_3$ and $E_5$, respectively. The use of aspheric surfaces on the front, positive power lens element $E_1$, on the last, negative power lens element $E_5$ and on a lens element $E_3$ in the middle unit $U_2$ provides several advantages. First, it helps to minimize the number of lens elements in the lens system.

Secondly, having one aspheric surface per lens unit results in aspheric surfaces being widely separated from one another, which in turn results in low sensitivity of the lens system to tilt, decentration, surface figure error (i.e. power irregularity) and thickness errors. Lens systems which utilize biaspheric elements tend to be very sensitive to alignment, especially tilt and decentration of one lens surface to the other and to the displacement of a lens element from the optical axis. The low sensitivity of the present lens system results in a zoom lens system that is easier and less expensive to manufacture and assemble than a typical zoom lens system of comparable performance.

Thirdly, in addition to decreasing the number of lens elements in the lens system, aspheric surfaces significantly increase the resultant image quality. The resulting image quality of lens systems 100 and 200 is very high given the relatively small number of elements, the large zoom ratio, and the small number of independently moving zooming lens units.

For example, zoom lens system 100 of the first illustrative embodiment has a maximum amount of astigmatism 0.4 and only 0.2% distortion in the wide-angle position, while in the telephoto position, the amount of astigmatism is less than 0.4 millimeters and the maximum distortion amount is only 1%. Similarly, zoom lens system 200 of the second illustrative embodiment has only 0.4 millimeters astigmatism and 2% distortion in the wide-angle position while in the telephoto position, the amount of astigmatism is 0.3 millimeters and the distortion is only 0.2%.

More specifically, the aspheric surface on the rear lens element $E_5$ has a strong conic contribution described by a conic coefficient K. This conic contribution controls field dependent aberrations such as Coma, Astigmatism and Petzval curvature. The use of an aspheric surface on a strong negative rear element $E_5$ allows field aberrations encountered at different zooming positions to be addressed with different segments of the lens aperture. This allows the use of higher order aspheric terms to compensate for field aberrations at the wide-angle zoom positions while the lower order aspheric terms are used primarily in the telephoto mode.

The compact zoom design utilizes low cost glasses, as well as a plastic element (such as lens element $E_3$) to minimize the cost of the lens system. The plastic element $E_3$ is chosen to be an element with relatively low power so that the environmental effects on the refractive index, surface radii and thickness of the plastic element will not greatly degrade the lens system performance over a wide range of temperature and humidity.

Figure 1A:
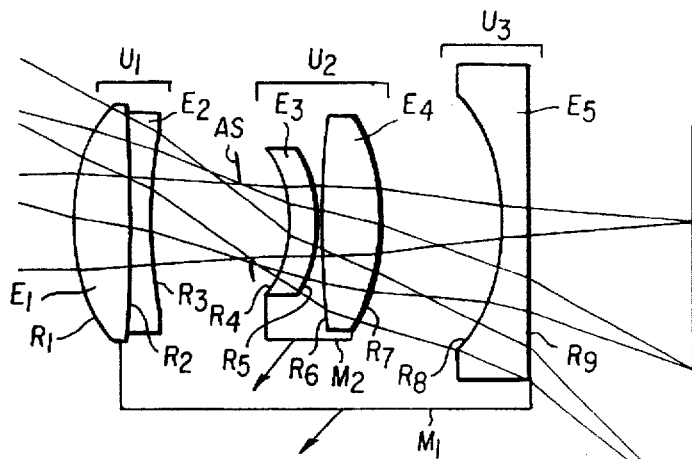
FIGS. 1A–1C show a sectional view of the lens system 100 of a first illustrative embodiment.
Figure 1B:
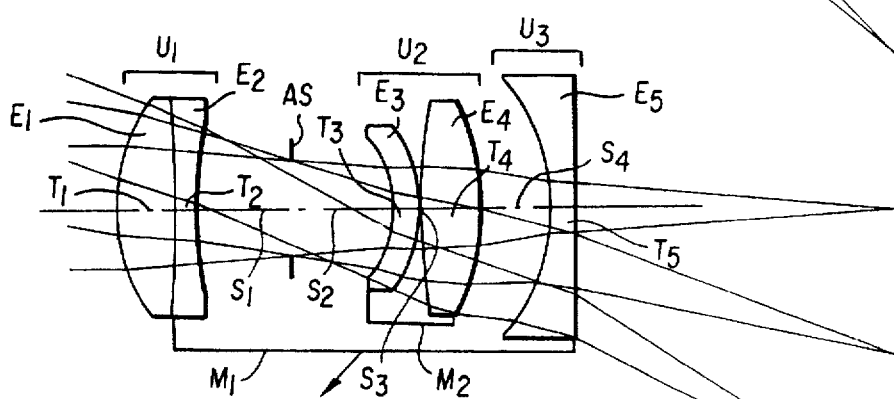
Figure 1C:
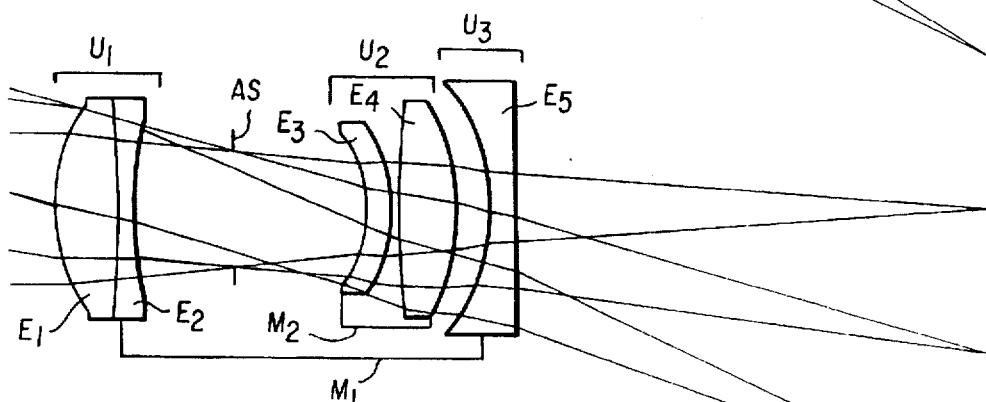
Figure 2D:
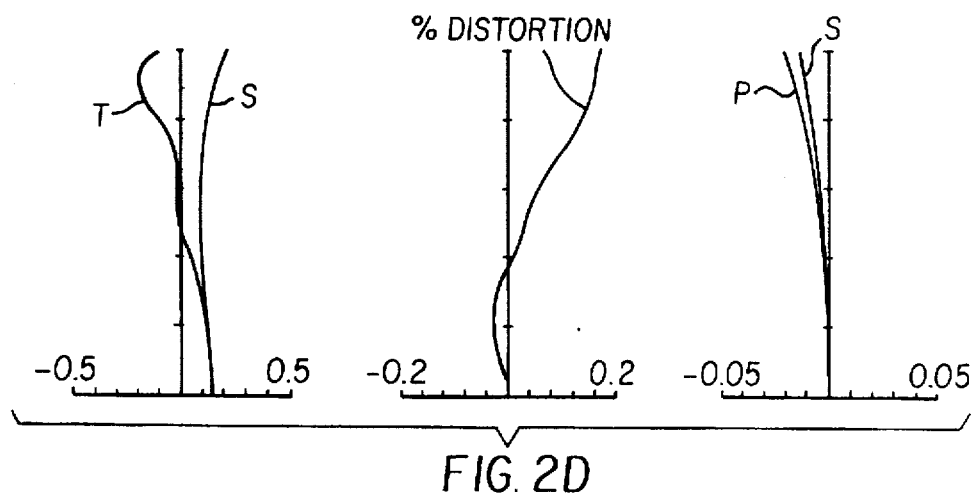
Figure 2E:
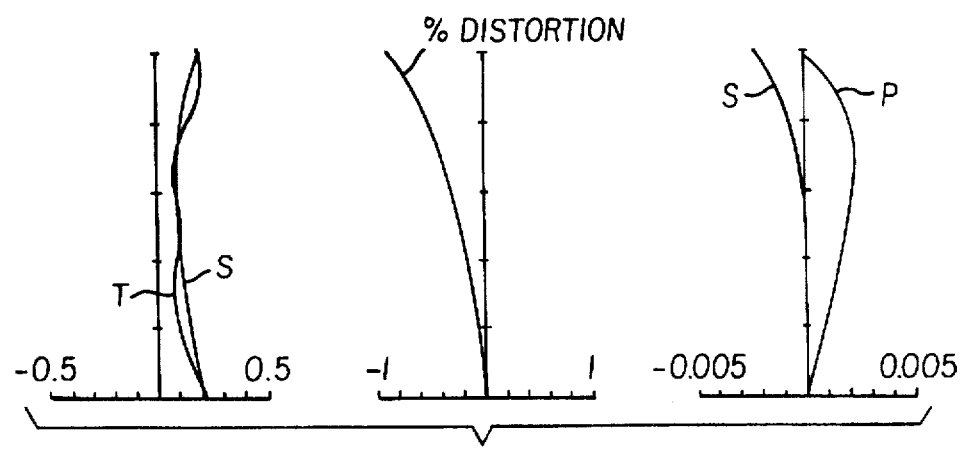
Figure 2F:
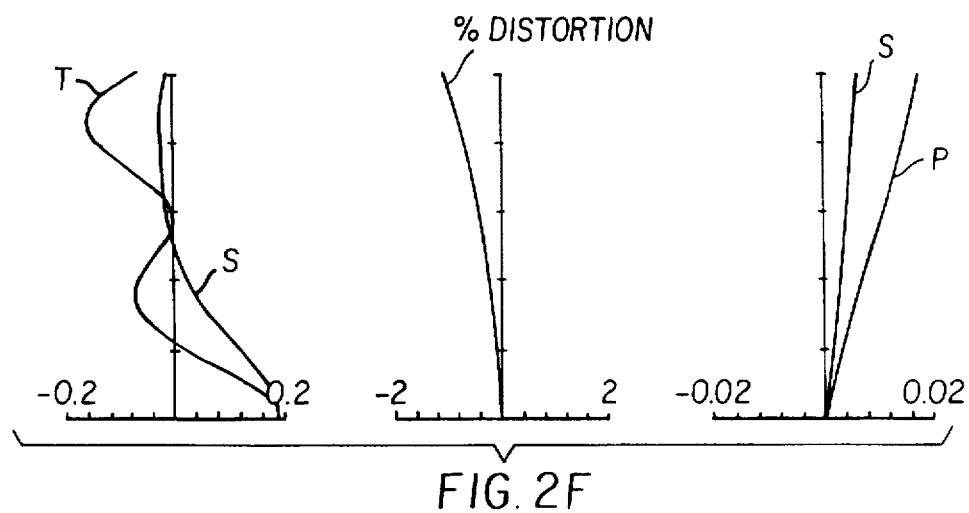
Figure 2G:
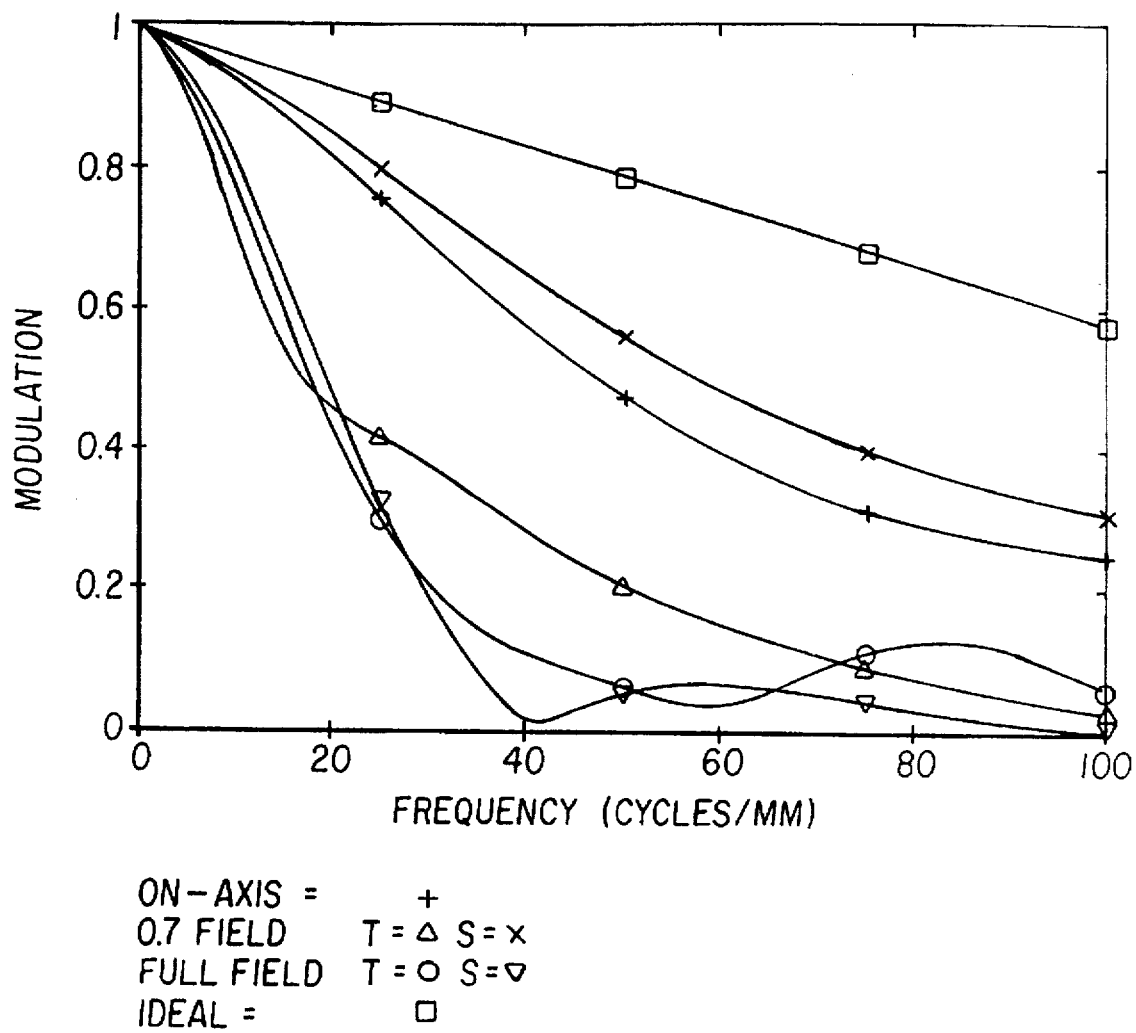
Figure 2H:
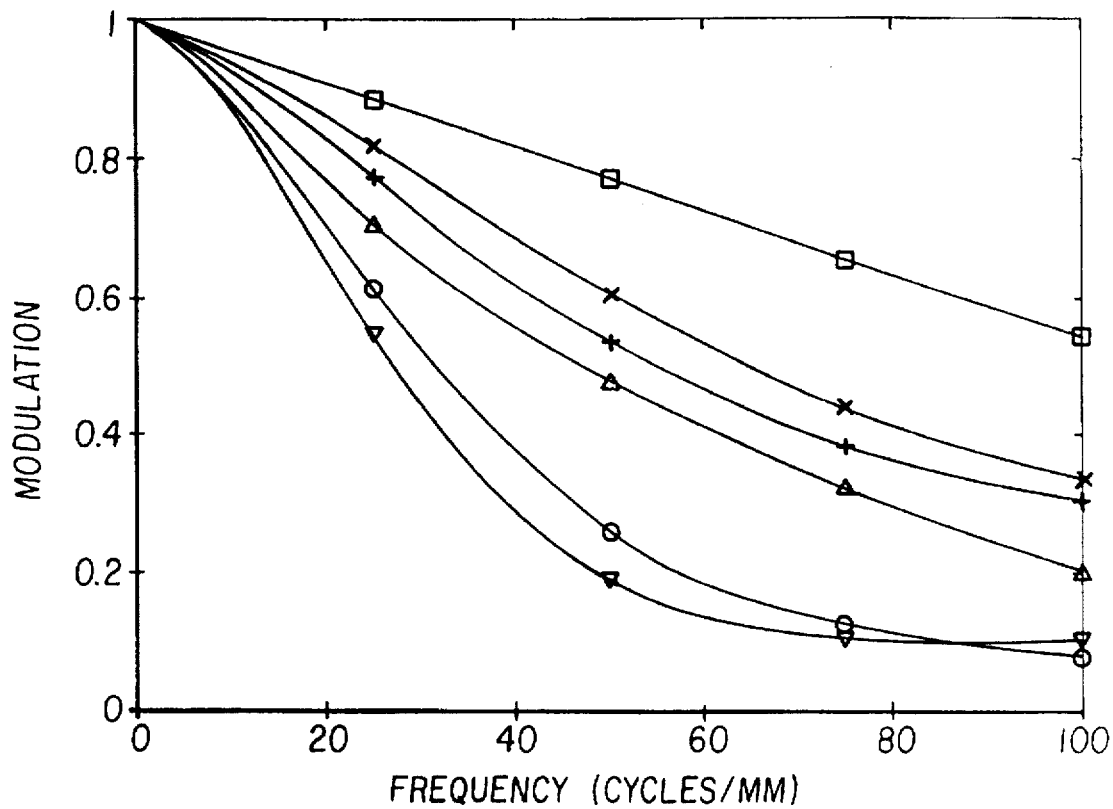
Figure 21:
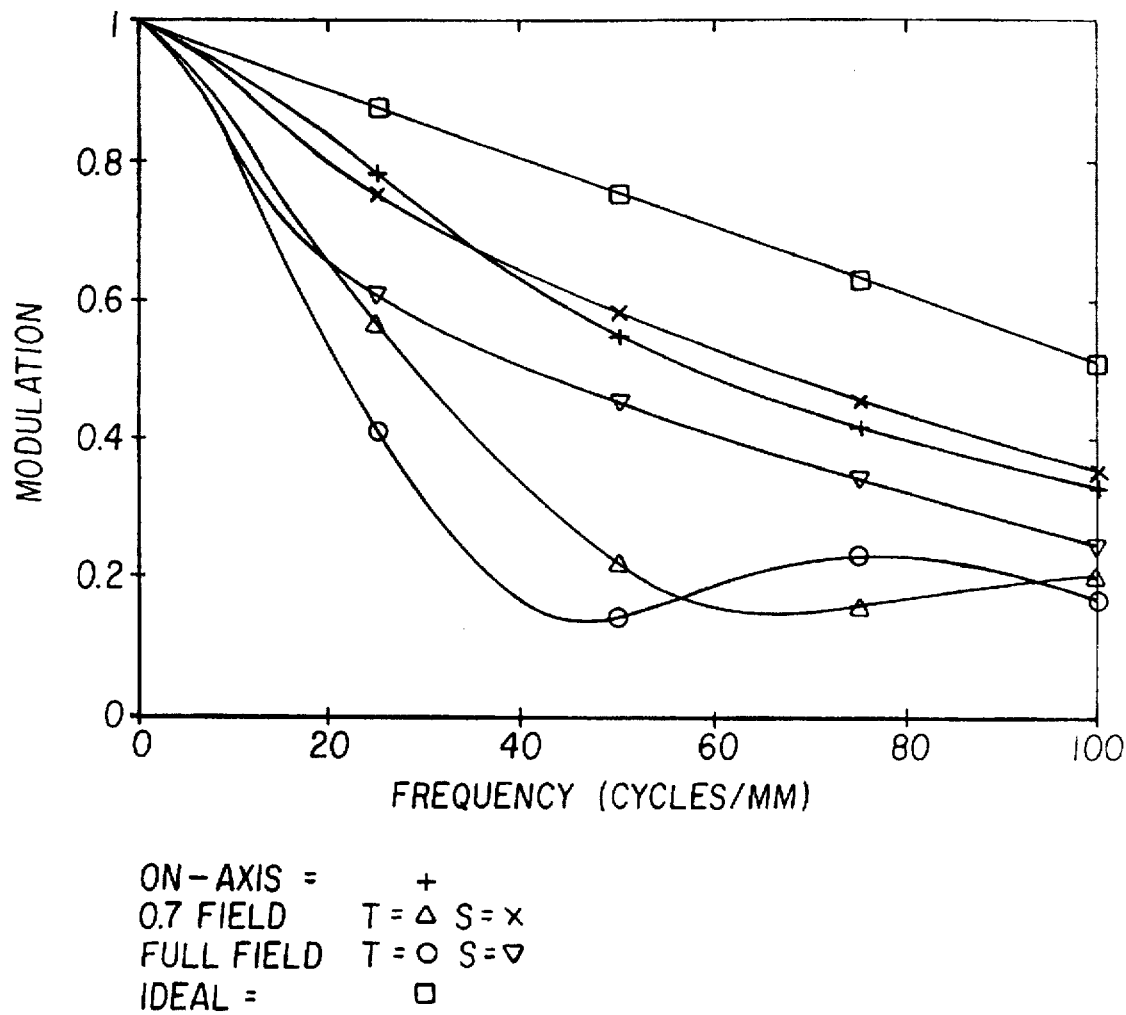
Figure 3A:
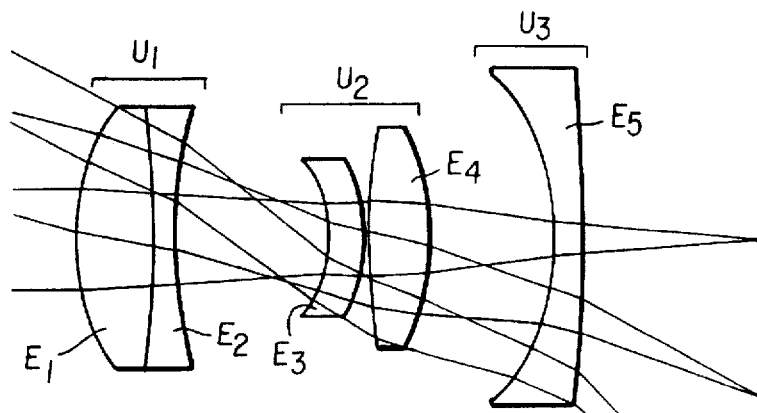
FIGS. 3A–3C are sectional views of the lens system 200 of a second illustrative embodiment.
Figure 3B:
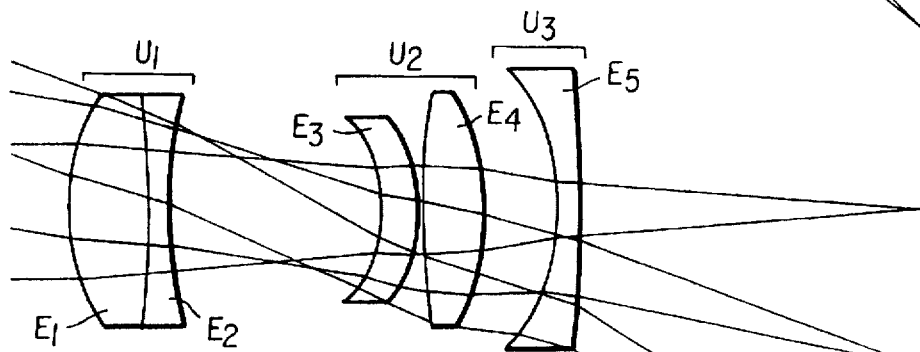
Figure 3C:
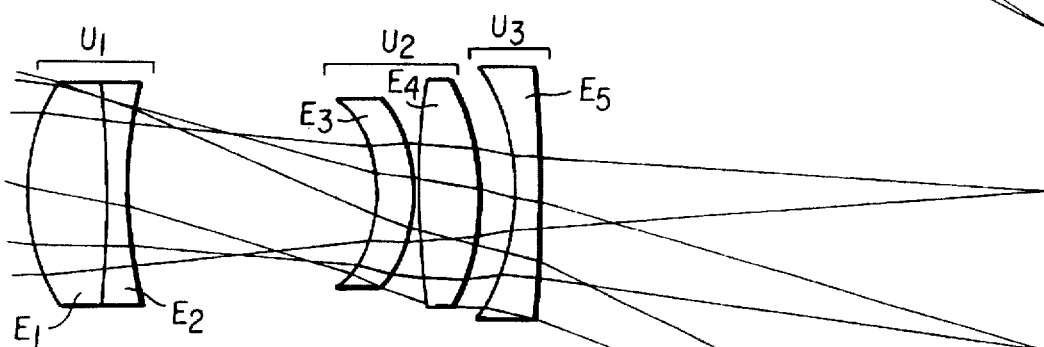

FIGS. 2A–2I and 4A–4I detail the performance of zoom lenses 100 and 200 at wide-angle, mid-zoom and telephoto positions. Included are ray traces for the various field positions, field curvature, distortion and lateral color plots, and MTF (Modulation Transfer Function) vs frequency graphs for the wide-angle, mid-zoom and telephoto zoom positions. More specifically, FIG. 2A provides ray intercept plots for lens 100 when it is operating in the telephoto position at 0, 0.7, and full field of view, respectfully. FIG. 2B provides ray intercept plots for lens 100 when it is operating in the middle position at 0, 0.7, and full field of view. FIG. 2C provides ray intercept plots for lens 100 when the lens system is operating at the wide-angle position. FIGS. 2D–2F represent Astigmatism, Distortion and Lateral color when the lens system is operating in the telephoto, middle and wide-angle position, respectfully.

Figure 4A:
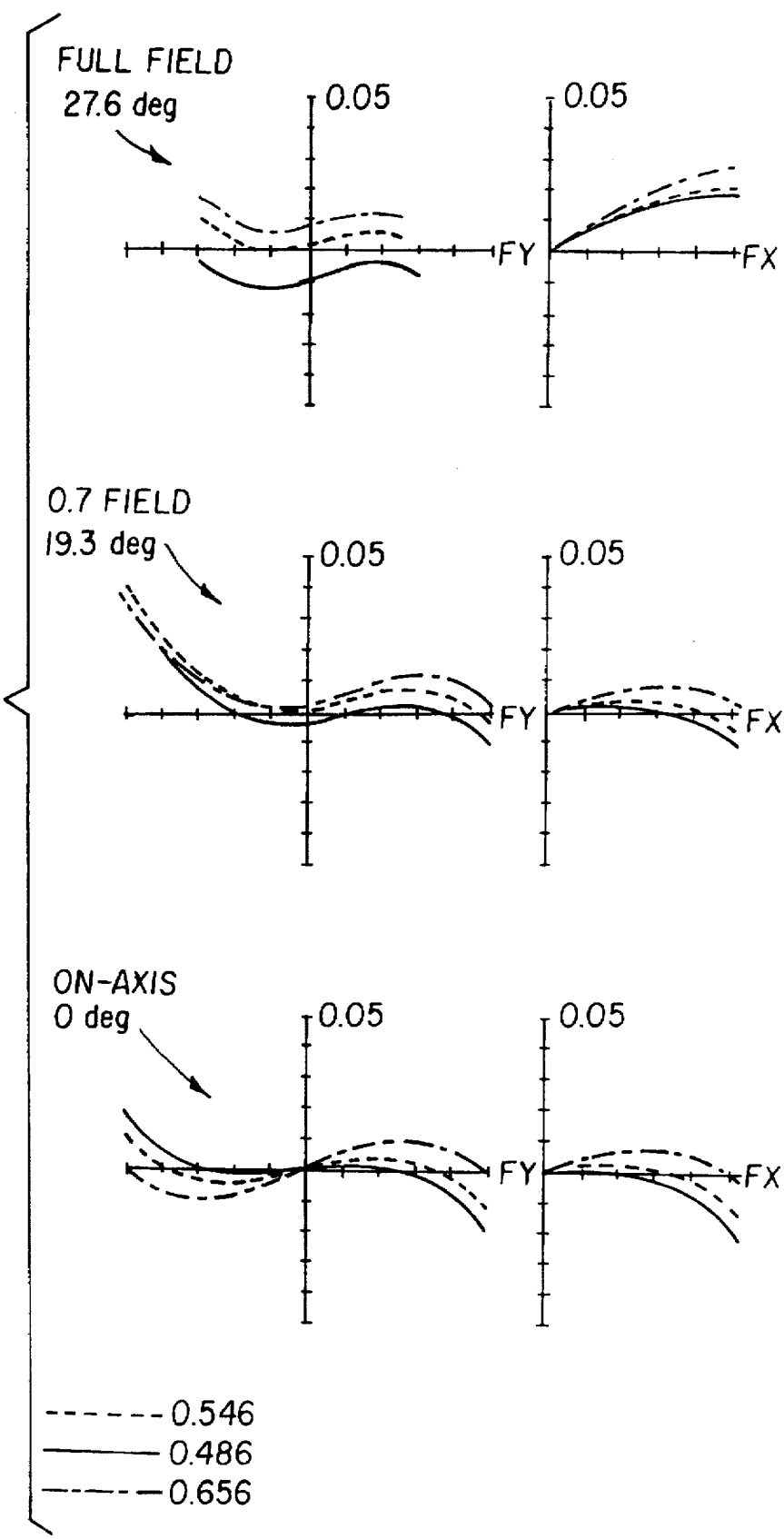
Figure 4D:
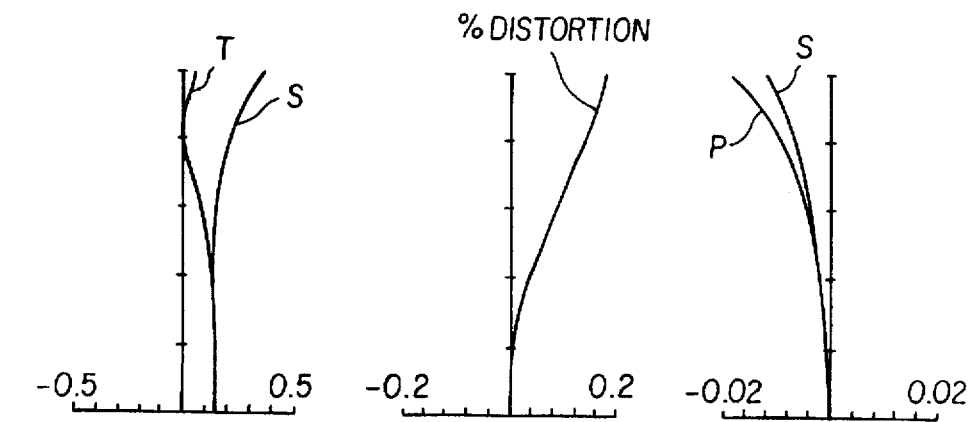
Figure 4E:
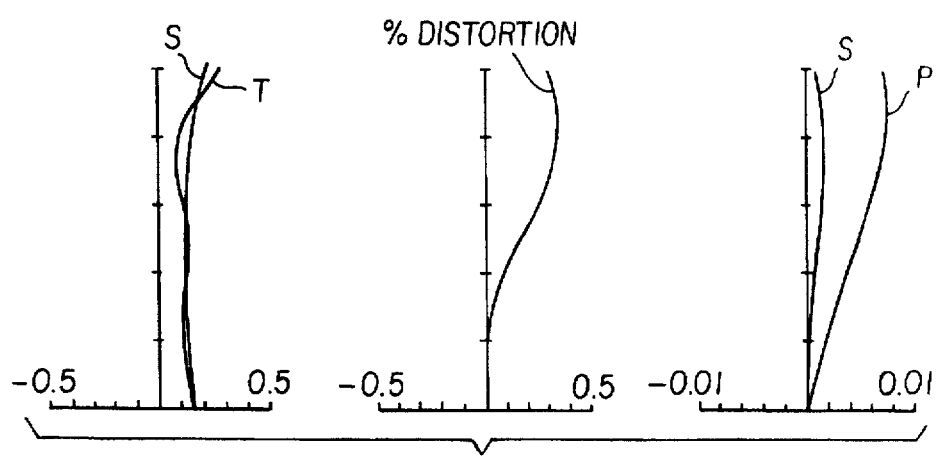
Figure 4F:
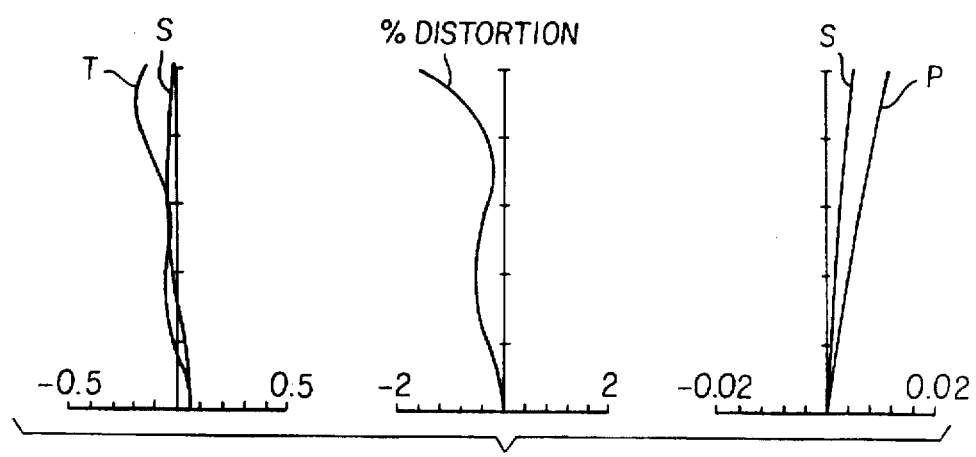
Figure 4G:
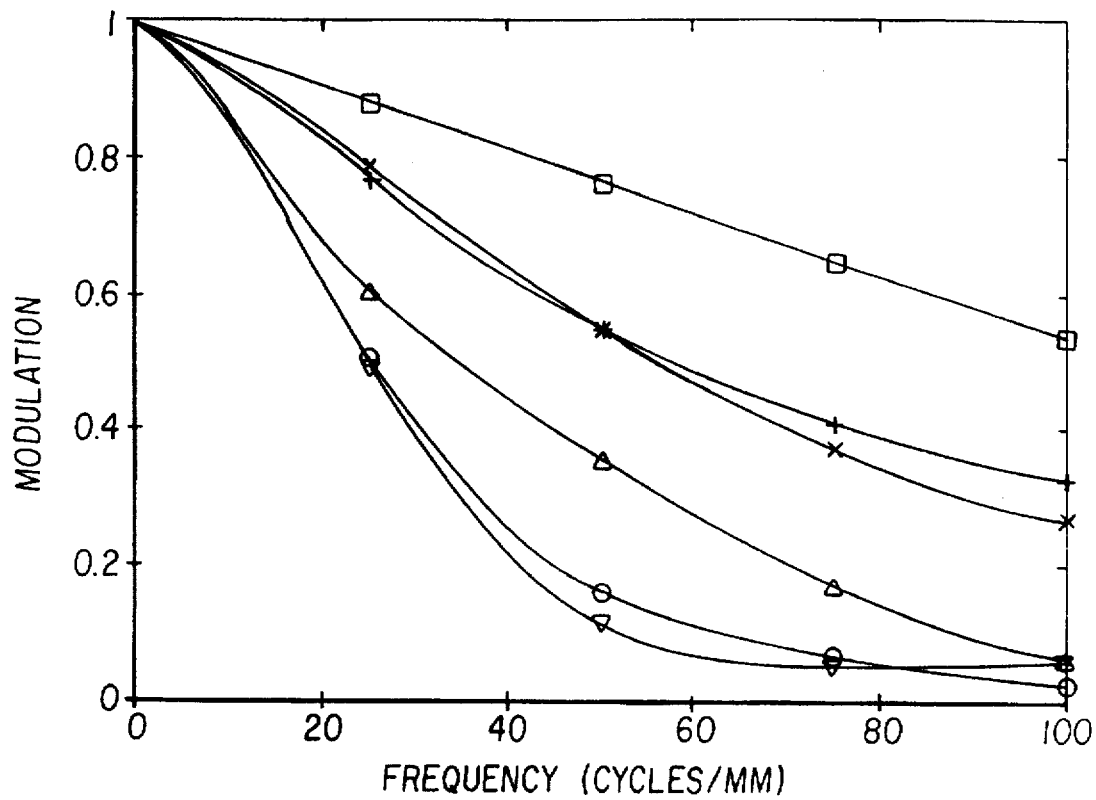
FIG. 4G–4I are plots of the Modulation Transfer Function (MTF) vs. frequency of the lens system 200 in wide-angle, middle, and telephoto positions, respectively.
Figure 4H:
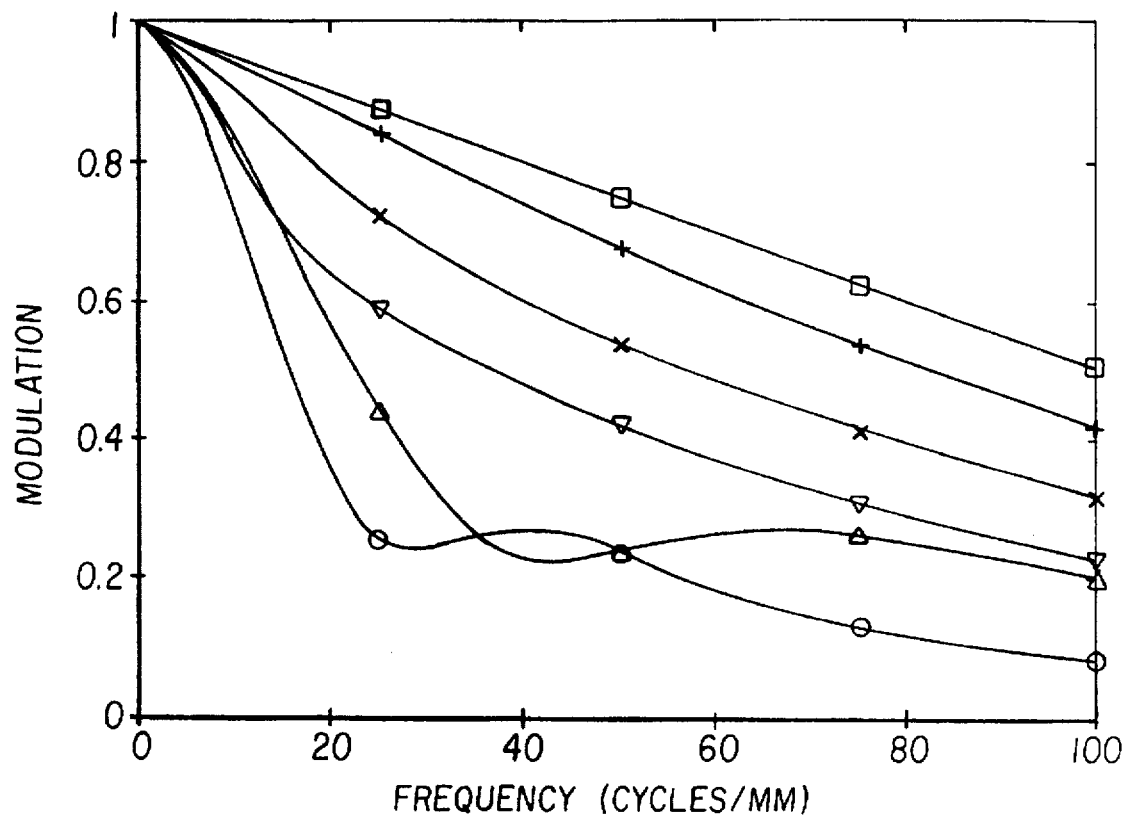
Figure 4I:
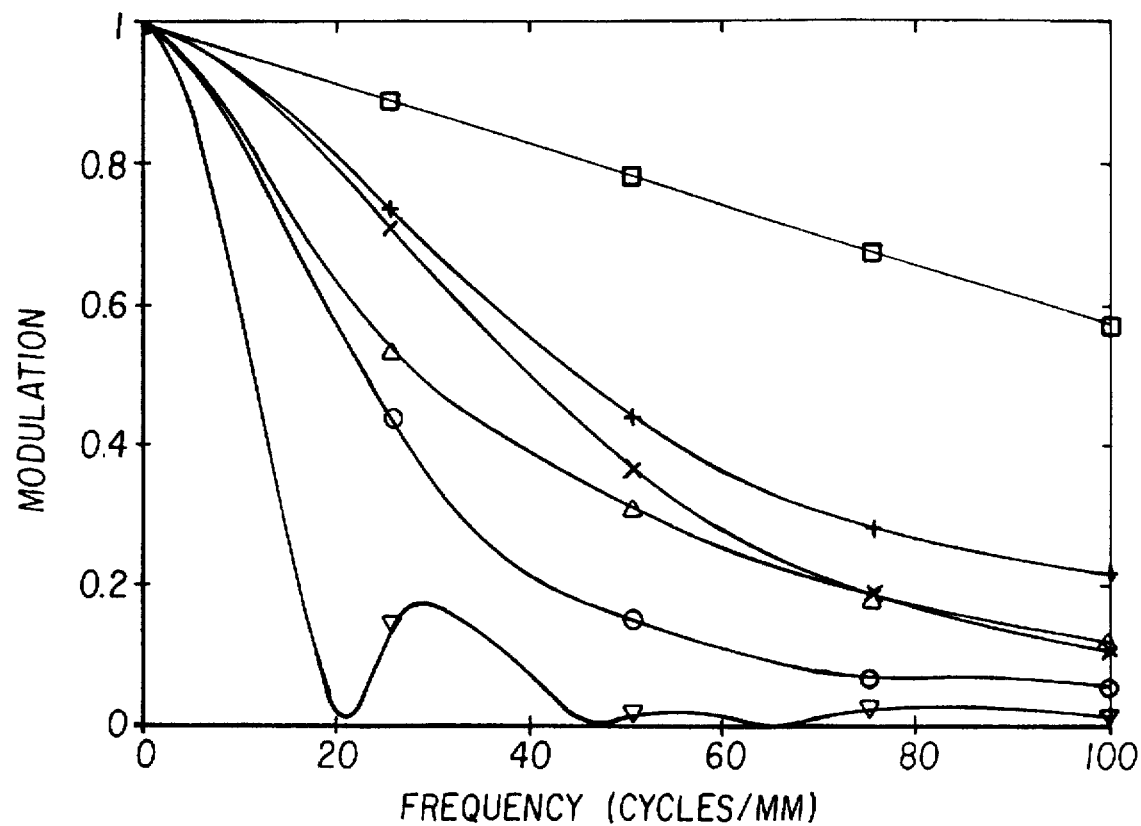

Similarly, FIG. 4A provides ray intercept plots for lens 200 when it is operating in the telephoto position at 0, 0.7, and full field of view, respectfully. FIG. 4B provides ray intercept plots for lens 200 when it is operating in the middle position at 0, 0.7, and full field of view. FIG. 4C provides ray intercept plots for lens 200 when the lens system is operating at the wide-angle position. FIGS. 4D–4F represent Astigmatism, Distortion and Lateral color when the lens system is operating in the telephoto, middle and wide-angle position, respectfully.

Note that the illustrative examples are corrected across a zoom range of between 1.5 and 2.0 with an F-number of approximately F/6.5. They have a compactness ratio $L_v/f<0.9$. The F-number ranges from F6 to F7.

EXAMPLE 1

TABLE 1A

| Surface | Radius | Thickness (T) | Glass | $N_e$ | v |
|---|---|---|---|---|---|
| *$R_1$ | 10.682 | 3.20 | BK7 | 1.519 | 64.41 |
| $R_2$ | −71.109 | 1.00 | BASF2 | 1.668 | 36.07 |
| $R_3$ | 24.422 | 4.95 | AIR | | |
| Aperture Stop | | $S_2$ = Variable | AIR | | |
| $R_4$ | −6.500 | 1.53 | DOW685 | 1.595 | 31.17 |
| *$R_5$ | −7.587 | 0.19 | AIR | | |
| $R_6$ | 42.991 | 3.20 | ZKN7 | 1.510 | 61.43 |
| $R_7$ | −12.677 | $S_4$ = Variable | AIR | | |
| *$R_8$ | −9.611 | 1.50 | SK16 | 1.623 | 60.56 |
| $R_9$ | −714.438 | $S_5$ = Variable | AIR | | |
| | Infinity | 6.4 | AIR | | |
| | Image Plane | | | | |

*Asphere

TABLE 1B

| Aspheric Coefficients | Surface | | |
|---|---|---|---|
| | $R_1$ | $R_5$ | $R_8$ |
| AD | −1.0574e-05 | 7.4391e-05 | 0.000206 |
| AE | 3.8537e-07 | 5.7942e-06 | −4.5804e-06 |
| AF | −4.0782e-08 | −3.1094e-07 | 4.9775e-07 |
| AG | 1.7146e-09 | 1.3769e-08 | −2.6264e-08 |
| AH | −3.5440e-11 | −2.5608e-10 | 7.9831e-10 |
| AI | 2.5218e-13 | 1.8017e-12 | −1.3647e-11 |
| AJ | 2.6456e-15 | 0 | 1.2042e-13 |
| AK | −5.1845e-17 | 0 | −4.1389e-16 |
| K | 0 | 0 | 0 |

| Wavelengths (μm) | | |
|---|---|---|
| $\lambda_1$ | $\lambda_2$ | $\lambda_3$ |
| 0.5461 | 0.4861 | 0.6563 | where K is a conic constant.

TABLE 1C

Zoom Spacing Data

| Zoom Position # | $S_2$ | $S_4$ | $S_5$ | *$L_v$ | BFL | EFL | f# |
|---|---|---|---|---|---|---|---|
| 1 (wide) | 2.804 | 6.770 | 2.34 | 33.88 | 8.8 | 31.0 | 6.0 |
| 2 | 4.572 | 5.007 | 6.787 | 38.33 | 13.18 | 37.725 | 6.25 |
| 3 | 5.855 | 3.725 | 11.013 | 42.56 | 17.41 | 44.45 | 6.5 |
| 4 | 6.858 | 2.722 | 15.195 | 46.74 | 21.59 | 51.175 | 6.75 |
| 5 (telephoto) | 7.679 | 1.900 | 19.430 | 50.78 | 25.83 | 57.9 | 7.0 |

| STOP Diameter | |
|---|---|
| Zoom Position # | Diameter |
| 1 (wide) | 5.16 |
| 2 | 6.04 |
| 3 | 6.84 |
| 4 | 7.58 |
| 5 (telephoto) | 8.28 |

*L is the distance from the front vertex of the lens to its image plane

EXAMPLE 2

TABLE 2A

| Surface | Radius | Thickness (T) | Glass | $N_e$ | v |
|---|---|---|---|---|---|
| *$R_1$ | 11.955 | 3.90 | SK7 | 1.587 | 61.08 |
| $R_2$ | −41.777 | 0.95 | BASF2 | 1.669 | 36.07 |
| $R_3$ | 23.258 | 4.95 | AIR | | |
| Aperture Stop | | Variable | AIR | | |
| $R_4$ | −6.700 | 1.90 | DOW685 | 1.595 | 31.17 |
| *$R_5$ | 7.769 | 0.19 | AIR | | |
| $R_6$ | 37.692 | 3.003 | ZKN7 | 1.510 | 61.43 |
| $R_7$ | −13.400 | Variable | AIR | | |
| *$R_8$ | −10.082 | 1.20 | TAC8 | 1.727 | 54.46 |
| $R_9$ | −118.703 | Variable | AIR | | |
| | Infinity | 6.4 | AIR | | |
| | Image Plane | | | | |

*Asphere

TABLE 2B

| Aspheric | Surface | | |
|---|---|---|---|
| Coefficients | $R_1$ | $R_5$ | $R_8$ |
| AD | −8.5730e-06 | 7.1570e-05 | 2.5054e-05 |
| AE | 7.7117e-07 | 3.8906e-06 | −2.6217e-06 |
| AF | −7.0218e-08 | −4.4400e-07 | 1.5430e-07 |
| AG | 2.9756e-09 | 4.7787e-08 | −4.8344e-09 |
| AH | −5.0403e-11 | −2.8556e-09 | 5.8777e-11 |
| AI | −2.7240e-13 | 9.5031e-11 | 3.5118e-13 |
| AJ | 1.9135e-14 | −1.5807e-12 | −1.5680e-14 |
| AK | −1.6964e-16 | 9.7372e-15 | 1.1055e-16 |
| K | 0 | 0 | −1.001539 |
| Wavelengths (μm) | | | |
| | $\lambda_1$ | $\lambda_2$ | $\lambda_3$ |
| | 0.5461 | 0.4861 | 0.6563 | where K is a conic constant.

TABLE 2C

| Zoom Spacing Data | | | | | | |
|---|---|---|---|---|---|---|
| Zoom Position # | $S_2$ | $S_4$ | $S_5$ | *$L_v$ | BFL | EFL | f# |
| 1 (wide) | 2.800 | 6.612 | 2.410 | 34.31 | 8.81 | 31.0 | 6.0 |
| 2 | 4.496 | 4.914 | 6.733 | 38.63 | 13.13 | 37.725 | 6.25 |
| 3 | 5.746 | 3.664 | 10.893 | 42.79 | 17.29 | 44.45 | 6.5 |
| 4 | 6.712 | 2.699 | 14.981 | 46.88 | 21.38 | 51.175 | 6.75 |
| 5 (telephoto) | 7.510 | 1.900 | 19.200 | 51.10 | 25.60 | 57.9 | 7.0 |

| STOP Diameter | |
|---|---|
| Zoom Position # | Diameter |
| 1 (wide) | 5.16 |
| 2 | 6.04 |
| 3 | 6.84 |
| 4 | 7.58 |
| 5 (telephoto) | 8.28 |

*L is the distance from the front vertex of the lens to its image plane

The invention has been described in detail with particular reference to a preferred embodiment thereof, but it will be understood that variations and modifications can be effected within the spirit and scope of the invention.

What is claimed is:

1. A zoom lens centered on an optical axis for imaging onto an image plane, said zoom lens comprising a plurality of lens elements arranged into:

a first, positive power lens unit including a frontmost positive lens element, and a negative lens element located behind said positive lens element, said first lens unit being movable toward and away from the image plane along the optical axis;

a second, negative power lens unit between the first lens unit and the image plane, said second lens unit being integral with the first lens unit so as to be movable therewith;

a third, positive power lens unit between the first and second lens units, said third lens unit being movable in the same direction as the first and second lens units at a slower speed than that at which the first and second lens units are moved, the plurality of lens elements have sufficient optical powers, spacings and radii of curvature to provide for a zoom range greater than 1.5 and to maintain an overall compactness so that $L_v/f_t<0.9$, where $L_v$ is the distance from the front vertex of the lens system to the film plane in the telephoto position and $f_t$ is the focal length of the lens system in the telephoto position.

2. A zoom lens according to claim 1, further having an aperture stop which moves integrally with said lens elements of said first lens unit.

3. A zoom lens according to claim 2 having at least one aspheric surface in each of said three lens units.

4. A zoom lens according to claim 2, wherein said positive lens element of said first lens unit is cemented to said negative lens element.

5. A zoom lens according to claim 2, wherein:

said lens elements of said first lens unit are a first biconvex lens element and a biconcave lens element; and the lens elements comprising said third lens unit and said second lens unit are, in order from the first lens unit, a meniscus lens element having a concave object side surface, a second biconvex lens element, and a negative lens element with a concave object side surface and an image side surface, said concave object side surface having a smaller radius of curvature than said image side surface.

6. A zoom lens according to claim 5, wherein said meniscus lens element and said second biconvex lens element form said second lens unit; and said negative lens element with said concave object side surface forms said third lens unit.

7. A zoom lens according to claim 1 having at least one aspheric surface in each of said three lens units.

8. A zoom lens centered on an optical axis for imaging onto an image plane, said zoom lens comprising a plurality of lens elements arranged into:

a first, positive power lens unit including a frontmost biconvex lens element and a biconcave lens element located behind said biconvex lens element said first lens unit being movable toward and away from the image plane along the optical axis;

a second, negative power lens unit between the first lens unit and the image plane, said second lens unit being integral with the first lens unit so as to be movable therewith;

a third, positive power lens unit between the first and second lens units, said third lens unit being movable in the same direction as the first and second lens units at a slower speed than that at which the first and second lens units are moved, the plurality of lens elements have sufficient optical powers, spacings and radii of curvature to provide for a zoom range greater than 1.5 and to maintain an overall compactness so that $L_y/f_t<0.9$, where $L_y$ is the distance from the front vertex of the lens system to the film plane in the telephoto position and $f_t$ is the focal length of the lens system in the telephoto position, the lens elements comprising said third lens unit and said second lens unit are, in order from the first lens unit, a meniscus lens element having a concave object side surface, a second biconvex lens element, and a negative lens element with a concave object side surface and an image side surface, said concave object side surface having a smaller radius of curvature than said image side surface.

9. A zoom lens according to claim 8, wherein said meniscus lens element and said second biconvex lens element form said second lens unit; and said negative lens element with said concave object side surface forms said third lens unit.

10. A zoom lens according to claim 8, further having an aperture stop which moves integrally with said lens elements of said first lens unit.

11. A zoom lens according to claim 8 having at least one aspheric surface in each of said three lens units.

12. A zoom lens comprising three lens units in order from object side:
  (a) a front lens unit of positive refractive power, said front lens unit consisting of a frontmost positive lens element and a negative lens element located behind said positive lens element;
  (b) a middle lens unit of positive refractive power; and
  (c) a rear lens unit of negative refractive power, said front lens unit and said rear lens unit are integral so as to be simultaneously movable at the same speed and direction during zooming from a wide-angle to a telephoto position while said middle lens unit is movable towards the object side at a relatively slower speed than that at which said front and rear units are moved, the lens elements having sufficient optical powers, spacings and radii of curvature to provide for a large zoom range ZR and to maintain an overall compactness so that $L_y/f_t<0.9$ and $ZR=f_t/f_w>1.5$, where $L_y$ is the distance from the front vertex of the lens system to film plane in the telephoto position, $f_t$ is the focal length of the lens system in the telephoto position, and $f_w$ is the focal length of the zoom lens system in the wide-angle position.

13. A zoom lens according to claim 12, further having an aperture stop which moves integrally with lens elements of said front lens unit.

14. A zoom lens according to claim 13 having at least one aspheric surface in each of said lens units.

15. A zoom lens according to claim 12 having at least one aspheric surface in each of said lens units.

16. A zoom lens comprising:
  only five lens elements arranged into three lens units in order from object to image side:
  (a) a front lens unit of positive refractive power, said front lens unit consisting of a positive lens element and a negative lens element and an aperture stop which moves integrally with said lens elements of said front lens unit;
  (b) a middle lens unit of positive refractive power arranged on the image side of said front lens unit; and
  (c) a rear lens unit of negative refractive power arranged on the image side of said middle lens unit; and wherein said front lens unit and said rear lens unit are simultaneously movable at the same speed while said middle lens unit is movable at a different speed so that the airspace between said front lens unit and said middle lens unit widens while the airspace between said middle lens unit and said rear lens unit narrows as the lens units move toward the object side along an optical axis when the zoom lens system zooms from a wide-angle mode towards a telephoto mode, wherein the lens elements have sufficient optical powers, spacings and radii of curvature to provide for a large zoom range ZR and to maintain an overall compactness so that $L_y/f_t<0.9$ and $ZR=f_t/f_w>1.5$, where $L_y$ is the distance from the front vertex of the lens system to film plane in the telephoto position, $f_t$ is the focal length of the lens system in the telephoto position, and $f_w$ is the focal length of the zoom lens system in the wide-angle position.

17. A zoom lens according to claim 16 having at least one aspheric surface in each of said lens units.

18. A zoom lens according to claim 17, wherein:
  said lens elements of said front lens unit are a first biconvex lens element and a biconcave lens element; and
  the lens elements comprising said middle lens unit and said rear lens unit are, in order from the front lens unit, a meniscus lens element having a concave object side surface, a second biconvex lens element, and a negative lens element with a concave object side surface and an image side surface, said concave object side surface having a smaller radius of curvature than said image side surface.

19. A zoom lens according to claim 16, wherein said positive lens element of said front lens unit is a frontmost lens element and is cemented to said negative lens element.

* * * * *